US012592614B2

(12) United States Patent
Riess et al.

(10) Patent No.: US 12,592,614 B2
(45) Date of Patent: Mar. 31, 2026

(54) ELECTRIC MACHINE

(71) Applicant: Schaeffler Technologies AG & Co. KG, Herzogenaurach (DE)

(72) Inventors: Stefan Riess, Kaufering (DE); Michael Menhart, Igling (DE); Johann Oswald, Eschenlohe (DE); Carsten Sonntag, Gauting-Konigswiesen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 216 days.

(21) Appl. No.: 18/553,742

(22) PCT Filed: Mar. 8, 2022

(86) PCT No.: PCT/DE2022/100183
§ 371 (c)(1),
(2) Date: Oct. 3, 2023

(87) PCT Pub. No.: WO2022/214122
PCT Pub. Date: Oct. 13, 2022

(65) Prior Publication Data
US 2024/0195267 A1 Jun. 13, 2024

(30) Foreign Application Priority Data
Apr. 10, 2021 (DE) .......................... 102021108950.6

(51) Int. Cl.
H02K 9/197 (2006.01)
H02K 16/04 (2006.01)
H02K 21/24 (2006.01)

(52) U.S. Cl.
CPC ............. *H02K 9/197* (2013.01); *H02K 21/24* (2013.01)

(58) Field of Classification Search
CPC .......... H02K 21/24; H02K 9/197; H02K 5/20; H02K 3/521; H02K 4/50; H02K 3/46; H02K 1/2793; H02K 16/00
(Continued)

(56) References Cited

U.S. PATENT DOCUMENTS

| | | | | |
|---|---|---|---|---|
| 2,873,395 A | * | 2/1959 | Kober .................... | H02K 21/24 310/112 |
| 3,662,196 A | * | 5/1972 | Ruschmann ........... | H02K 25/00 310/46 |

(Continued)

FOREIGN PATENT DOCUMENTS

| | | |
|---|---|---|
| DE | 102014204433 A1 | 9/2014 |
| DE | 102015013018 A1 | 4/2017 |

(Continued)

OTHER PUBLICATIONS

ATZ magazine, vol. 113, May 2011, pp. 360-365 by Erik Schneider, Frank Fickl, Bernd Cebulski and Jens Liebold with the title: Hochintegrativ und Flexibel Elektrische Antriebseinheit für E-Fahrzeuge [Highly Integrative and Flexible Electric Drive Unit for E-Vehicles].

(Continued)

*Primary Examiner* — Burton S Mullins
(74) *Attorney, Agent, or Firm* — Volpe Koenig

(57) ABSTRACT

An electric machine, in particular an axial flux machine, including a rotor mounted in a dry chamber rotatable relative to a stator, the rotor having a rotor shaft with at least one first disk-shaped rotor member which is non-slidably arranged on the rotor shaft for conjoint rotation therewith, the stator having a first annular disk-shaped stator member and a second annular disk-shaped stator member which are arranged coaxially to one another and coaxially to the rotor shaft and are axially spaced apart from one another, the rotor being arranged in the space therebetween. The first stator (Continued)

member has a first stator winding, and the second stator member has a second stator winding, the first stator winding being arranged within a first hydraulic chamber, and the second stator winding being arranged within a second hydraulic chamber, at least part of the stator windings being able to come into contact with a hydraulic fluid in the hydraulic chambers The first stator winding has first winding ends which protrude from the first stator member and which extend in the axial direction radially above the stator member, and the second stator winding has second winding ends which protrude from the second stator member and which extend in the axial direction radially above the first stator member and the second stator member.

10 Claims, 3 Drawing Sheets

(58) Field of Classification Search
USPC ........................................ 310/54, 156.35, 71
See application file for complete search history.

(56) References Cited

U.S. PATENT DOCUMENTS

| | | | | |
|---|---|---|---|---|
| 5,982,070 A * | 11/1999 | Caamano | ............... | H02K 1/185 310/43 |
| 6,163,097 A * | 12/2000 | Smith | ...................... | H02K 3/04 310/67 R |
| 8,823,241 B2 * | 9/2014 | Jore | ....................... | H02K 21/24 310/179 |
| 10,951,075 B2 * | 3/2021 | Woolmer | ............... | H02K 21/24 |
| 11,476,734 B1 * | 10/2022 | Lee | ......................... | H02K 5/203 |
| 11,649,742 B2 * | 5/2023 | Yokoyama | ........... | B60T 13/741 188/158 |
| 2012/0001523 A1 | 1/2012 | Lordo | | |
| 2019/0334399 A1 | 10/2019 | Masuda | | |

FOREIGN PATENT DOCUMENTS

| | | | | |
|---|---|---|---|---|
| EP | 1367690 A2 | 12/2003 | | |
| EP | 3157138 A1 | 4/2017 | | |
| EP | 3764526 A1 * | 1/2021 | ............. | H02K 9/197 |
| JP | 2018082610 A | 5/2018 | | |
| WO | 2019241765 A1 | 12/2019 | | |

OTHER PUBLICATIONS

Markus Schiefer: Indirekte Wicklungskühlung von hochausgenutzten permanenterregten Synchronmaschinen mit Zahnspulenwicklung [Indirect winding cooling of highly utilized permanently excited synchronous machines with tooth coil winding], dissertation, Karlsruher Institut für Technologie (KIT), 2017.

* cited by examiner

ELECTRIC MACHINE

CROSS-REFERENCE TO RELATED APPLICATIONS

This application is the U.S. National Phase of PCT Appln. No. PCT/DE2022/100183, filed Mar. 8, 2022, which claims the benefit of German Patent Appln. No. 102021108950.6, filed Apr. 10, 2021, the entire disclosures of which are incorporated by reference herein.

TECHNICAL FIELD

The present disclosure relates to an electric machine, in particular an axial flux machine.

BACKGROUND

Electric motors are increasingly being used to drive motor vehicles in order to create alternatives to internal combustion engines that require fossil fuels. Significant efforts have already been made to improve the suitability of electric drives for everyday use and also to be able to offer users the driving comfort they are accustomed to.

A detailed description of an electric drive can be found in an article in the ATZ magazine, Volume 113, 05/2011, pages 360-365 by Erik Schneider, Frank Fickl, Bernd Cebulski and Jens Liebold with the title: *Hochintegrativ und Flexibel Elektrische Antriebseinheit für E-Fahrzeuge* [Highly Integrative and Flexible Electric Drive Unit for E-Vehicles]. This article describes a drive unit for an axle of a vehicle, which comprises an electric motor that is arranged concentrically and coaxially with a bevel gear differential, wherein a switchable 2-speed planetary gear set is arranged in the drive train between the electric motor and the bevel gear differential, which is also positioned coaxially to the electric motor or the bevel gear differential or spur gear differential. The drive unit is very compact and allows a good compromise between climbing ability, acceleration and energy consumption due to the switchable 2-speed planetary gear set. Such drive units are also referred to as e-axles or electrically operable drive trains.

In addition to purely electrically powered drive trains, hybrid drive trains are also known. Such drive trains of a hybrid vehicle usually comprise a combination of an internal combustion engine and an electric motor, and enable—for example in urban areas—a purely electric mode of operation with both sufficient range and availability, in particular when driving cross-country. In addition, there is the possibility of driving the internal combustion engine and the electric motor at the same time in certain operating situations.

In the development of electric machines intended for e-axles or hybrid modules, there is a continuing need to increase their power densities, such that the cooling of the electric machines required for this purpose is becoming increasingly important. Due to the necessary cooling capacity, hydraulic fluids, such as cooling oils, have prevailed in most concepts for dissipating heat from the thermally stressed areas of an electric machine.

Jacket cooling and winding head cooling are known, for example, from the prior art for cooling electric machines by means of hydraulic fluids. While jacket cooling transfers the heat generated on the outer surface of the stator laminations into a cooling circuit, with winding head cooling, the heat transfer takes place directly on the conductors outside the stator laminations in the region of the winding heads into the fluid.

Further improvements are provided by separate cooling channels, which are introduced both into the laminated core of the stator (see e.g., EP3157138 A1) and into the slot in addition to the conductors (see e.g., Markus Schiefer: Indirekte Wicklungskühlung von hochausgenutzten permanenterregten Synchronmaschinen mit Zahnspulenwicklung [Indirect winding cooling of highly utilized permanently excited synchronous machines with tooth coil winding], dissertation, Karlsruher Institut für Technologie (KIT), 2017).

Concepts are also known in which hydraulic fluid flows directly around the windings in order to increase the power density. Improved cooling with direct contact between the hydraulic fluid and the conductor in the groove is already known in principle from the prior art. For example, DE102015013018 A1 describes a solution for electric machines with single-tooth windings, wherein the fluid flows directly around the windings that are wound around the teeth.

SUMMARY

The object of the disclosure is to provide an electric machine that has a high power density due to optimized cooling and an optimized electromagnetic design and is at the same time designed to be particularly compact and easy to assemble.

This object is achieved by an electric machine, in particular an axial flux machine, comprising a rotor that is mounted in a dry chamber so as to be rotatable relative to a stator, wherein the rotor has a rotor shaft with at least one first disk-shaped rotor member which is non-slidably arranged on the rotor shaft for conjoint rotation therewith, wherein the stator has a first annular disk-shaped stator member and a second annular disk-shaped stator member which are arranged coaxially to one another and coaxially to the rotor shaft and are axially spaced apart from one another, the rotor being arranged in the space therebetween, and the first stator member has a first stator winding, and the second stator member has a second stator winding, wherein the first stator winding is arranged within a first hydraulic chamber, and the second stator winding is arranged within a second hydraulic chamber, wherein at least part of the stator windings can come into contact with a hydraulic fluid in the hydraulic chambers, wherein the first stator winding has first winding ends which protrude from the first stator member and which extend in the axial direction radially above the stator member, and the second stator winding has second winding ends which protrude from the second stator member and which extend in the axial direction radially above the first stator member and the second stator member.

The electric machine according to the disclosure, in particular an electrical axial flux machine, can advantageously minimize the machine space by connecting the phase connections purely axially or for the most part axially. Due to the axial connection, the lead-through of the winding ends of the stators in the electric machine is also carried out axially, as a result of which they run parallel or approximately parallel to the main axis of the machine. The main axis of the machine is formed by the rotation of the bearings. During assembly, the winding ends of the stator windings can also advantageously be guided through local axial clearances in the electric machine when the stator bodies are pushed together. The connection points of the winding ends of the stators are arranged in a particularly preferred manner purely axially or largely axially. Furthermore, in an advantageous further development of the disclosure, connecting conductors arranged on the face side can connect the individual phases to the phase connections of the electric machine. These measures lead to a reduction in the installation space of the electric machine according to the disclosure compared to the prior art and at the same time to a simple assembly of the electric machine, including the connection of the winding ends.

According to the disclosure, the winding ends of the electric machine thus run in such a way that, when assembled, the winding ends are oriented parallel or approximately parallel to the main axis of the machine. During assembly, the winding ends are preferably guided to one of the end faces of the electric machine through appropriately designed local clearances in the electric machine and, after the corresponding axial pushing together of the corresponding machine parts, are electrically and mechanically connected in a suitable manner. The winding ends of the stators connected in this way are, in a particularly preferred manner, led to the axially positioned phase connections on the face side via connecting conductors. These connecting conductors can be seamlessly connected to the winding by winding ends or can be electrically and mechanically connected to the winding in a suitable manner. The star point(s) of the electric machine are preferably not implemented up to the phase connection.

First, the individual elements of the claimed subject matter of the disclosure are explained in the order in which they are named in the claims and particularly preferred embodiments of the subject matter of the disclosure are described below.

Electric machines are used to convert electrical energy into mechanical energy and/or vice versa, and generally comprise a stationary part referred to as a stator, stand or armature, and a part referred to as a rotor or runner and arranged movably relative to the stationary part. In the case of electric machines designed as rotation machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator. The electric machine according to the disclosure can be designed as an axial flux machine or radial flux machine.

The stator of the electric machine can be designed in particular as a stator for a radial flux machine. The stator of a radial flux machine is typically constructed cylindrically and preferably consists of electrical laminations that are electrically insulated from one another and are constructed in layers and packaged to form laminated cores. Distributed over the circumference, grooves or channels can be embedded into the electrical lamination running parallel to the rotor shaft, and can accommodate the stator winding or parts of the stator winding. The stator designed for a radial flux machine can be designed as a stator for an internal rotor or an external rotor. In the case of an internal rotor, for example, the stator teeth extend radially inwards, while in the case of an external rotor they extend radially outwards.

The electric machine according to the disclosure is intended in particular for use within a drive train of a hybrid or fully electric motor vehicle. In particular, the electric machine is dimensioned such that vehicle speeds of more than 50 km/h, preferably more than 80 km/h and in particular more than 100 km/h can be achieved. The electric machine particularly preferably has an output of more than 30 kW, preferably more than 50 kW and in particular more than 70 kW. Furthermore, it is preferred that the electric machine provides speeds greater than 5,000 rpm, particularly preferably greater than 10,000 rpm, very particularly preferably greater than 12,500 rpm.

A stator winding is an electrically conductive conductor whose length extension is much greater than its extension perpendicular to its length extension. The stator winding can generally have any cross-sectional shape. Rectangular cross-sectional shapes are preferred, as these allow for high packing densities and consequently high power densities to be achieved. Particularly preferably, a stator winding is formed of copper. Preferably, a stator winding has an insulation. To insulate the stator winding, for example, mica paper, which for mechanical reasons can be reinforced by a glass fabric bearer, may be wound in tape form around one or more stator windings, which are impregnated by means of a curing resin. In principle, it is also possible to use a curable polymer or varnish layer without a mica paper to insulate a stator winding.

According to an advantageous embodiment of the disclosure, it can be provided that the electric machine is designed as an axial flux machine, comprising the rotor that is mounted in a dry chamber so as to be rotatable relative to the stator, wherein the rotor has the rotor shaft with at least the first disk-shaped rotor member which is non-slidably arranged on the rotor shaft for conjoint rotation therewith, wherein the stator comprises the first annular disk-shaped stator member and the second annular disk-shaped stator member, which are arranged coaxially with one another and with the rotor shaft and are spaced apart axially with the rotor being arranged therebetween. The advantage of this configuration is that the electric machine can be designed to be very compact axially.

The magnetic flux in such an electric axial flux machine (AFM), such as an electric drive machine of a motor vehicle designed as an axial flux machine, is directed axially to a direction of rotation of the rotor of the axial flux machine in the air gap between the stator and the rotor. There are various types of axial flux machines. One known type is what is termed an I arrangement, in which the rotor is arranged so as to be axially adjacent to a stator or between two stators. Another known type is what is termed an H arrangement, in which two rotors are arranged on opposite axial sides of a stator. In the context of the present disclosure, an I-arrangement is preferred.

The electric machine can preferably also comprise a hydraulic connecting element which hydraulically connects the first hydraulic chamber to the second hydraulic chamber, wherein at least one electrical conductor of the first stator winding and/or the second stator winding is arranged within the hydraulic connecting element. The hydraulic connecting element can have any closed cross-sectional geometry and can be designed, for example, as a pipe or hose for bridging one or more joints between a first hydraulic chamber of a first stator member and a second hydraulic chamber of a second stator member. This hydraulic connecting element also ensures that the electrical conductor of a stator winding is guided therein and at the same time is surrounded by the coolant. A suitable selection of the material of the hydraulic connecting element and a corresponding wall thickness can at the same time achieve an electrical insulation effect with respect to electrically conductive housing parts. The hydraulic connecting element can preferably be plugged or inserted into existing openings. In addition, air gaps and creepage distances within the electric machine can be adjusted with the hydraulic connecting element.

The sealing effect of the hydraulic connecting element to adjoining housing parts can be achieved, for example, by a defined gap between the sealing element and the housing by pressing the hydraulic connecting element in the sealing area with adjoining housing parts using a separate sealing element or a sealant. The sealing element can preferably also be integrated into the hydraulic connecting element for the sealed and electrically insulated passage.

According to an advantageous embodiment of the disclosure, it can be provided that the first hydraulic chamber is surrounded, at least in part, by a delimiting first housing component, which has a plurality of circumferentially distributed openings for the passage of the second winding ends.

According to a further preferred development of the disclosure, it can also be provided that the first winding ends are arranged on a circular path with a first diameter and the second winding ends are arranged on a circular path with a second diameter, wherein the first diameter is different from the second diameter. It can thus be achieved that the winding ends do not contact each other unintentionally.

Furthermore, according to a likewise advantageous embodiment of the disclosure, it can be provided that the first winding ends and the second winding ends are oriented towards the same axial end face of the axial flux machine. According to a further particularly preferred embodiment of the disclosure, it can be provided that the first winding ends and the second winding ends are connected on the same axial end face of the axial flux machine, as a result of which the assembly effort can be further reduced.

Furthermore, the disclosure can also be further developed such that the first stator winding and the second stator winding are each configured at least in three phases with a star point connection.

In order to provide an electrical contact between a wet chamber and a dry chamber of the electric machine, in particular at least one electrical connecting element can particularly preferably be provided. For this purpose, the electrical connecting element has a contacting member which is fixed in a receiving sleeve by means of a press fit. In particular, it can be provided to use a bolt pressed into the receiving sleeve or a threaded bush as the contacting member, the main function of which is to support the clamping forces, for example via the supporting cross-section and an undercut. The material of the bolt or the threaded bushing advantageously has a higher mechanical load capacity (yield point) than the material of the receiving sleeve. The receiving sleeve for its part preferably has a higher specific electrical conductivity compared to the contacting member. On the other hand, the material of the receiving sleeve is softer and therefore has a lower mechanical load capacity (yield point) than the material of the contacting member.

The contacting member designed as a bolt or threaded bush is preferably pressed into the housing component in such a way that the softer material is deformed elastically and plastically, so that the sealing effect is sufficient to seal the two chambers on both sides of the housing component from one another or one chamber from the environment. For this purpose, a widening of the cross-section, which is designed for the deformation of the softer material, is particularly preferably provided on the contacting member, for example on the bolt or the threaded bushing. The elastic part of the deformation ensures that the contact pressure is maintained and the plastic part of the deformation ensures the lengthening of the sealing sections in the area provided for this purpose. Excess material from the counterpart is taken up in a designated area. At the same time, the widening of the cross-section of the contacting member, for example the bolt or the threaded bushing, creates an undercut which counteracts the pull-out of the receiving sleeve. The chamber for accommodating the excess material during the pressing-in process can preferably also be equipped with additional sealing means or sealing elements and thus further increase the sealing effect.

The receiving sleeve with the pressed-in contacting member, for example the bolt or the threaded bushing, is particularly preferably mounted in the housing component in an electrically insulated manner. For example, either the housing component can be made of an electrically poorly conductive material or an insulating material or it can be inserted into an electrically non-conductive adapter that implements the electrical insulating effect between the housing component and the assembly of contacting member and receiving sleeve. The sealing effect can be achieved, for example, via sealing elements between the receiving sleeve and the adjacent housing component or adapter.

BRIEF DESCRIPTION OF THE DRAWINGS

The disclosure will be explained in more detail below with reference to figures without limiting the general concept of the disclosure.

In the figures.

DETAILED DESCRIPTION

Figure 1:
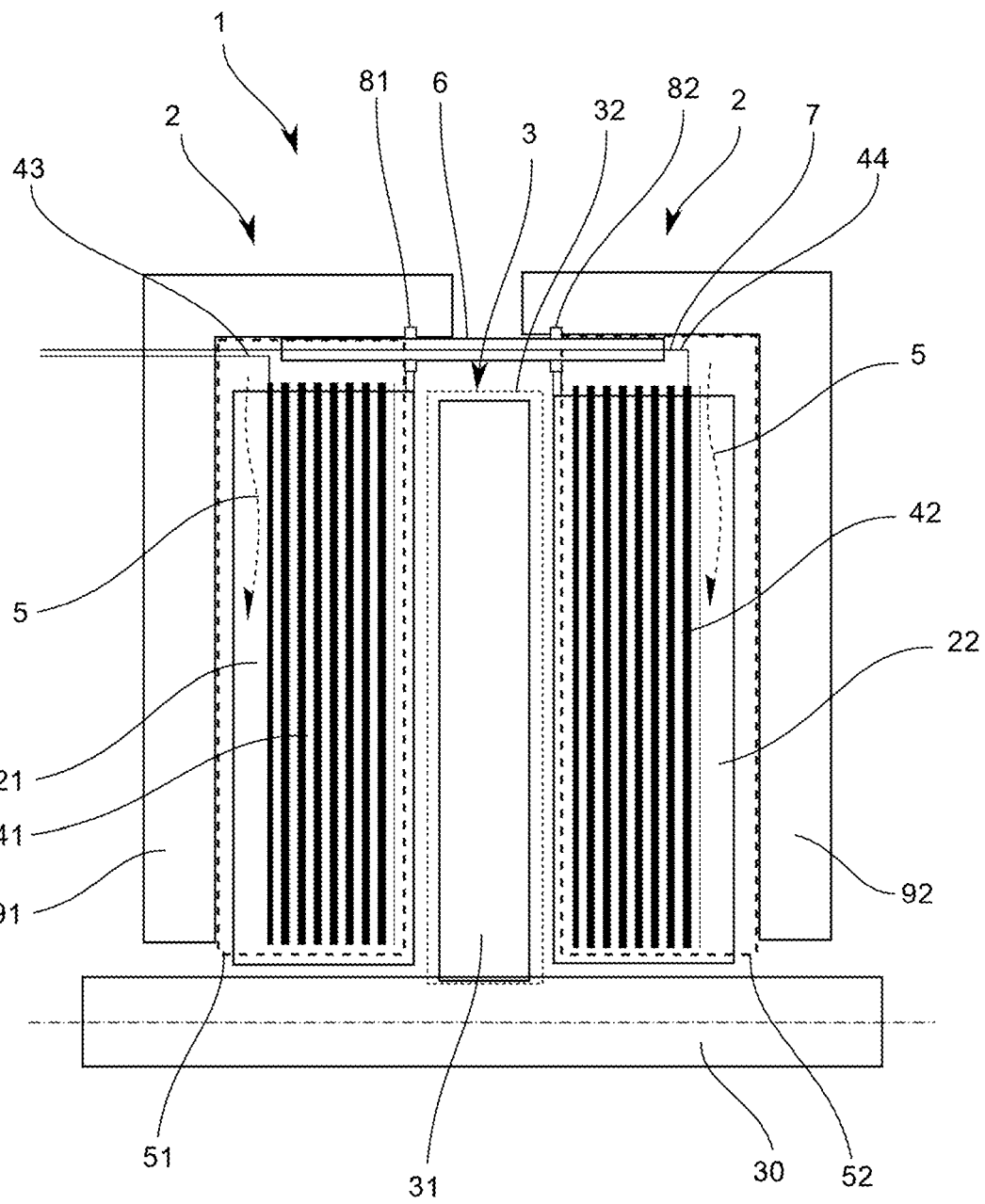
FIG. 1 shows an electric axial flux machine in a schematic axial sectional view.
Figure 3:
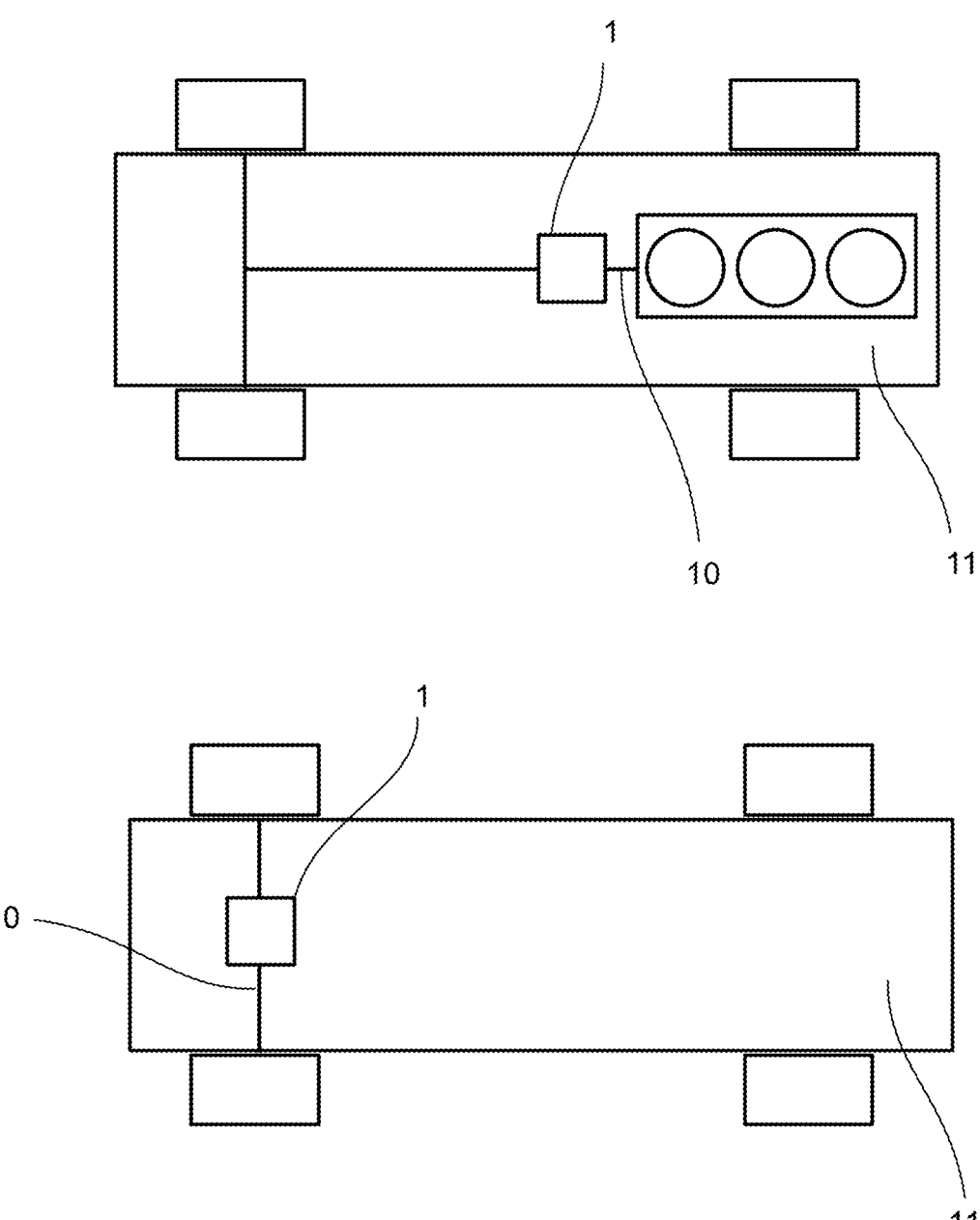
FIG. 3 shows a motor vehicle having an electric machine in a schematic block diagram.

FIG. 1 shows an electric axial flux machine 1 for an electrically driven drive train 10 of a motor vehicle 11, as shown by way of example in FIG. 3. The upper illustration of FIG. 3 shows the drive train 10 of a hybrid-driven vehicle and the lower illustration shows a fully electrically driven motor vehicle 11, each having an electric machine 1.

The axial flux machine 1 comprises a rotor 3 which is mounted in a dry chamber 32 so that it is rotatable relative to a stator 2, wherein the rotor 3 has a rotor shaft 30 with at least one first disk-shaped rotor member 31 non-slidably arranged on the rotor shaft 30 for conjoint rotation therewith. The stator 2 in turn comprises a first annular disk-shaped stator member 21 and a second annular disk-shaped stator member 22 which are arranged coaxially with one another and with the rotor shaft 30 and are spaced apart axially with the rotor 3 being arranged therebetween.

The first stator member 21 has a first stator winding 41 and the second stator member 22 has a second stator winding 42, wherein the first stator winding 41 is arranged within a first hydraulic chamber 51 and the second stator winding 42 is arranged within a second hydraulic chamber 52, within which the respective stator windings 41, 42 can each be contacted by a hydraulic fluid 5 at least in part.

Figure 2:
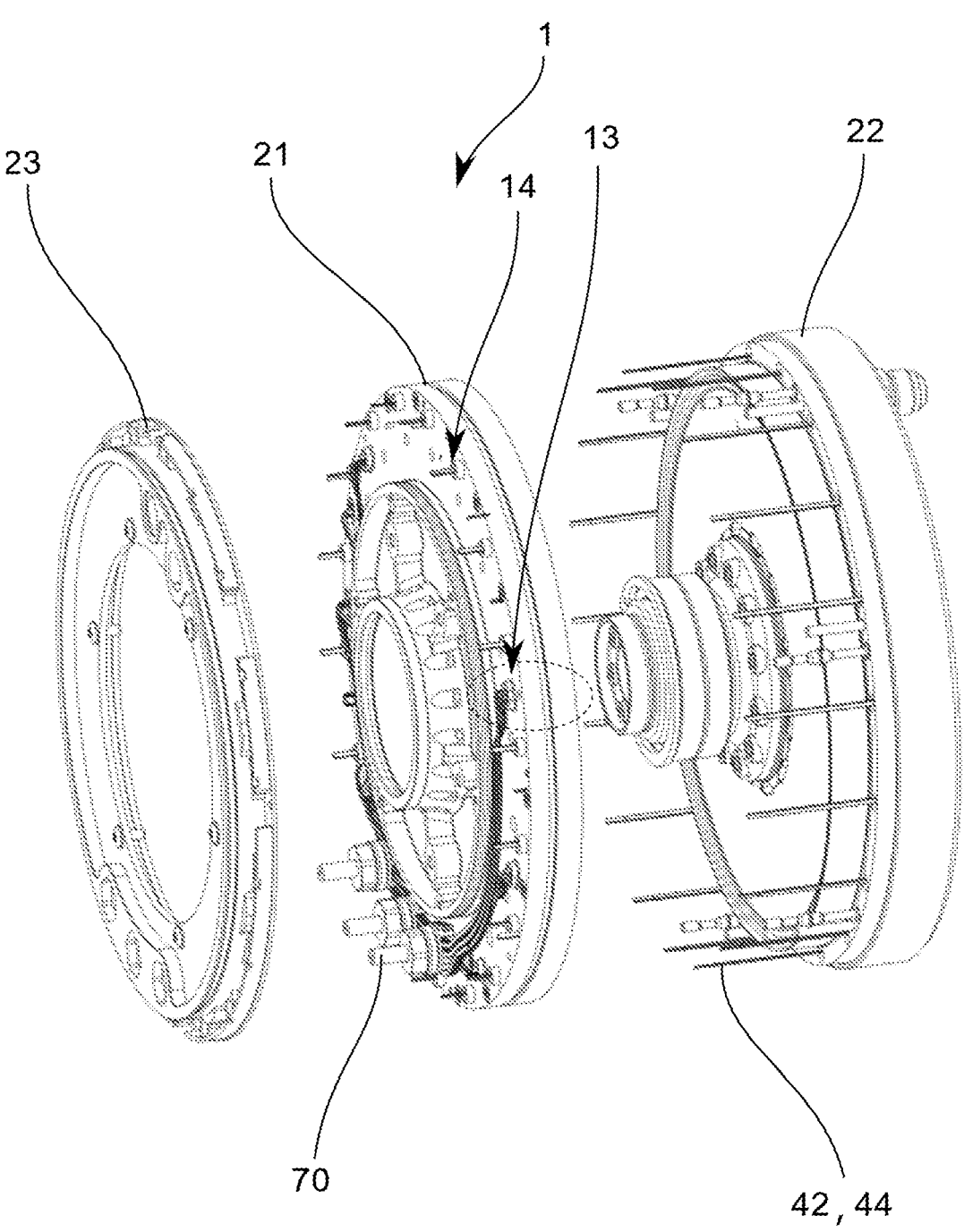
FIG. 2 shows an electric axial flux machine in a perspective exploded view.

The first stator winding 41 has first winding ends 43 emerging from the first stator member 21 and extending radially above the stator member 21 in the axial direction. The second stator winding 42 also has second winding ends 44 emerging from the second stator member 22, which extend radially above the first stator member 21 and the second stator member 22 in the axial direction. Looking at FIG. 1 together with FIG. 2, it can also be seen that the first hydraulic chamber 51 is surrounded at least in part by a delimiting first housing component 91, which has a plurality of circumferentially distributed openings 13, 14 for the passage of the second winding ends 44.

The first winding ends 43 are arranged on a circular path with a first diameter and the second winding ends 44 are arranged on a circular path with a second diameter, wherein the first diameter is different from the second diameter.

The first winding ends 43 and the second winding ends 44 are oriented towards the same axial end face of the axial flux machine 1 and are connected to the same axial end face of the axial flux machine 1. The first stator winding 41 and the second stator winding 42 are each configured in at least three phases with a star point connection.

The electric machine 1 also has a plurality of hydraulic connecting elements 6 which hydraulically connect the first hydraulic chamber 51 to the second hydraulic chamber 52. At least one electrical conductor 7 of the second stator winding 42 is arranged within each of the hydraulic connecting elements 6. The plurality of essentially identically designed hydraulic connecting elements 6 is distributed circumferentially between the first hydraulic chamber 51 and the second hydraulic chamber 52.

The hydraulic connecting element 6 is formed from an electrically non-conductive material and has an essentially cylindrical, annular, three-dimensional shape. In the embodiment shown, the hydraulic connecting elements 6 are positioned radially above the first stator member 21 and the second stator member 22.

FIG. 1 also shows that each hydraulic connecting element 6 has a first seal 81, which seals the first hydraulic chamber 51 from the dry chamber 32 of the rotor 2, and the hydraulic connecting element 6 has a second seal 82, which seals the second hydraulic chamber 52 from the dry chamber 32 of the rotor 2. In the exemplary embodiment shown, the first seal 81 and the second seal 82 are designed as sealing rings.

The hydraulic connecting elements 6 are each connected by means of a press fit to a first housing component 91 that surrounds the first hydraulic chamber 51, at least in part, and to a second housing component 92 that surrounds the second hydraulic chamber 52, at least in part.

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Axial flux machine
2 Stator
3 Rotor
4 Stator winding
5 Hydraulic chamber
10 Drive train
11 Motor vehicle
13 Openings
14 Openings
21 Stator member
22 Stator member
30 Rotor shaft
31 Rotor member
32 Dry chamber

41 Stator winding
42 Stator winding
43 Winding ends
44 Winding ends
51 Hydraulic chamber
52 Hydraulic chamber
91 Housing component

The invention claimed is:

1. An electric machine comprising:
a rotor mounted in a dry chamber rotatable relative to a stator, the rotor having a rotor shaft with at least one first disk-shaped rotor member non-slidably arranged on the rotor shaft for conjoint rotation therewith, the stator having a first annular disk-shaped stator member and a second annular disk-shaped stator member arranged coaxially to one another and coaxially to the rotor shaft axially spaced apart from one another, the rotor being arranged axially therebetween, and the first stator member having a first stator winding, and the second stator member having a second stator winding, the first stator winding being arranged within a first hydraulic chamber, and the second stator winding being arranged within a second hydraulic chamber, at least part of the first and second stator windings configured to contact a hydraulic fluid in the hydraulic chambers, wherein the first stator winding has first winding ends protruding from the first stator member and extending in an axial direction radially outside the first stator member, and the second stator winding has second winding ends protruding from the second stator member and extending in the axial direction radially outside the first stator member and the second stator member, wherein the first hydraulic chamber is surrounded at least partially by a delimiting first housing component which has a plurality of circumferentially distributed openings for the passage of the second winding ends.

2. The electric machine according to claim 1, wherein the first winding ends are arranged on a circular path with a first diameter and the second winding ends are arranged on a circular path with a second diameter, wherein the first diameter is different from the second diameter.

3. The electric machine according to claim 1, wherein the first winding ends and the second winding ends are oriented towards a common axial end face of the axial flux machine.

4. The electric machine according to claim 3, wherein the first winding ends and the second winding ends are connected on the common axial end face of the axial flux machine.

5. The electric machine according to claim 1, wherein the first stator winding and the second stator winding are each configured in at least three phases with a star point connection.

6. A stator for an electric machine comprising:
a first annular disk-shaped stator member and a second annular disk-shaped stator member arranged coaxially and axially spaced apart from one another, the first stator member having a first stator winding, and the second stator member having a second stator winding, the first stator winding being arranged within a first hydraulic chamber, and the second stator winding being arranged within a second hydraulic chamber, at least part of the first and second stator windings configured to contact a hydraulic fluid in the hydraulic chambers, wherein the first stator winding has first winding ends protruding from the first stator member and extending in an axial direction radially outside the first stator member, and the second stator winding has second winding ends protruding from the second stator member and extending in the axial direction radially outside the first stator member and the second stator member, wherein the first hydraulic chamber is surrounded at least partially by a delimiting first housing component which has a plurality of circumferentially distributed openings for the passage of the second winding ends.

7. The stator according to claim 6, wherein the first winding ends are arranged on a circular path with a first diameter and the second winding ends are arranged on a circular path with a second diameter, wherein the first diameter is different from the second diameter.

8. The stator according to claim 6, wherein the first winding ends and the second winding ends are oriented towards a common axial end face.

9. The stator according to claim 8, wherein the first winding ends and the second winding ends are connected on the common axial end face.

10. The stator according to claim 6, wherein the first stator winding and the second stator winding are each configured in at least three phases with a star point connection.

* * * * *